(12) United States Patent
Zillinger

(10) Patent No.: US 11,542,807 B2
(45) Date of Patent: Jan. 3, 2023

(54) ACCURATE RENDERING OF ACOUSTIC IMAGES

(71) Applicant: DarkVision Technologies Inc, North Vancouver (CA)

(72) Inventor: Eric Zillinger, Vancouver (CA)

(73) Assignee: DarkVision Technologies Inc, North Vancouver (CA)

(*) Notice: Subject to any disclaimer, the term of this patent is extended or adjusted under 35 U.S.C. 154(b) by 217 days.

(21) Appl. No.: 17/151,321

(22) Filed: Jan. 18, 2021

(65) Prior Publication Data
US 2021/0230995 A1 Jul. 29, 2021

(30) Foreign Application Priority Data
Jan. 23, 2020 (GB) .................................. 2000960

(51) Int. Cl.
*E21B 47/002* (2012.01)
*G06T 7/00* (2017.01)
*G01V 1/48* (2006.01)

(52) U.S. Cl.
CPC ........ *E21B 47/0025* (2020.05); *G06T 7/0004* (2013.01); *G01V 1/48* (2013.01); *G01V 2210/74* (2013.01)

(58) Field of Classification Search
USPC ............................................................ 702/6
See application file for complete search history.

(56) References Cited

U.S. PATENT DOCUMENTS

| | | | |
|---|---|---|---|
| 9,538,081 B1* | 1/2017 | Zhou | H04N 5/23264 |
| 2015/0371429 A1* | 12/2015 | Spicer | G06T 15/503 |
| | | | 345/420 |
| 2018/0085093 A1* | 3/2018 | Shikama | G01S 15/89 |
| 2018/0106142 A1 | 4/2018 | Nguyen et al. | |
| 2021/0356615 A1* | 11/2021 | Nguyen | E21B 47/026 |

* cited by examiner

Primary Examiner — Paul D Lee

(57) ABSTRACT

A device, system and method to process acoustic images of tubulars and wellbores. Corrections for real-world logging are calculated and stored in correction Look Up Tables (LUT), which are used to display projections or create geometric models of the wellbore or tubular. The user interface allows the user to interact with the projections to update the LUTs to operate on the images. This process helps correct for real-world challenges such as tool eccentricity, tool rotation, tool angle, and speed of sound differences in order to create a more intuitive rendering.

20 Claims, 5 Drawing Sheets

ACCURATE RENDERING OF ACOUSTIC IMAGES

RELATED APPLICATIONS

The This application claims priority to United Kingdom Application No. GB2000960.1, filed on Jan. 23, 2020, the disclosure of which is incorporated herein by reference in its entirety.

FIELD OF THE INVENTION

The invention relates generally to processing data of images of wellbores and tubulars from a radial array of acoustic transducer, in particular coordinate transformations, storage and visualization of images.

BACKGROUND OF THE INVENTION

Tubulars, such as pipes, tubes and casings, and wellbores may be inspected by acoustic imaging tools in order to detect leaks into or out of them. These tubulars tend to be many kilometers long, which presents problems for storing acoustic images and processing them.

A typical data flow would be to acquire cross-sectional frames of the tubular and store them as scan lines, which creates a natively polar coordinate system for a radial array. During subsequent visualization, the stored images are converted to Cartesian coordinates, with neighbouring polar pixels combined for each Cartesian pixel, and rendering makes the compiled images of the tubular into an intuitive display. These Cartesian images are loaded into video memory as X, Y, Z pixels (aka voxels). The GPU operates on these Cartesian pixels to create visualization appropriate to the 2D monitor used by operators. The scan conversion from acquired ultrasound images to displayed images can be pre-computed for efficient viewing.

However, the inventors have appreciated that in real-world inspection of tubulars there are further considerations for rendering and processing the data for a user.

SUMMARY OF THE INVENTION

The present invention aims to address one or more of the above shortcomings by storing and processing the ultrasound data in an efficient manner. There are properties of the cylindrical conduit and sensors on the tool that may be used to improve storage, visualization and GUI interaction.

In accordance with a first aspect of the invention there is provided method of processing acoustic data comprising: receiving acoustic images of tubulars, determining logging correction values for plural locations of the tubular; rendering one or more projections of the tubular for a user display by: identifying display pixels required in display space; identifying image pixels in the acoustic images corresponding to each display pixel using a) a coordinate transformation from acoustic image space to display space and b) the plural logging correction values; and blending the corresponding image pixels to create the display pixels. Then the method displays the one or more projections on the user display.

The method may comprise receiving a user input regarding a spatial offset, updating the logging correction values based on the spatial offset, and redisplaying the projection(s) using the updated logging correction values.

Determining the logging correction values may be performed in response to receiving a user input defining the logging corrections values as spatial offsets in one of the displayed projections. The logging correction values may be initially determined at least partly from sensors of the imaging device. The logging correction values relate to at least one of: eccentricity of the imaging device with respect to the tubular; rotation of the imaging device with respect to the tubular; misalignment of longitudinal axes of the imaging device and tubular, and incidence angle of acoustic transducers of the imaging device with respect to a wall of the tubular; and speed of sound of fluid in the tubular.

The acoustic images may have image pixels arranged in a first dimension representing scan lines in azimuth of an imaging device and in a second dimension representing radial distance outward from said imaging device.

Rendering may comprise one or more of: shading, texturing, lighting, and ray tracing.

The method may acquire the acoustic images by logging an imaging device having a radial array of acoustic transducers through the tubular longitudinally.

The projections may include tube view and cross-section view of the tubular.

The coordinate transformation may convert from polar coordinates of the image space to cartesian coordinates in display space.

At least one projection may be orthogonal to another projection.

In accordance with a second aspect of the invention there is provided a system for processing acoustic images of a tubular. The system comprises a user interface, one or more computing devices configured to: receive acoustic images of tubulars; determine plural logging correction values for plural locations of the tubular; render one or more projections of the tubular for a user interface; and display the one or more projections on the user interface. Rendering is performed by: identifying display pixels required in display space; identifying image pixels in the acoustic images corresponding to each display pixel using a) a coordinate transformation from acoustic image space to display space and b) the plural logging correction values; and blending the corresponding image pixels to create the display pixels.

The system may comprise an imaging device having a radial array of acoustic transducers. The acoustic images may have image pixels arranged in a first dimension representing scan lines in azimuth of the imaging device and in a second dimension representing radial distance outward from the imaging device.

The imaging display may comprise sensors and wherein the logging correction values are initially determined at least partly from the sensors, preferably wherein the sensors are one or more of: accelerometers, gyro meters, speed of sound sensors and magnetometers.

The computing device(s) may comprise memory for storing the logging correction values in a Look Up Table (LUT).

The systems may perform any of the above method steps.

Further aspects of the invention are set out below and in the appended claims. Thus, preferred embodiments of the invention enable the device to image conduits, such as pipes and wells over long distances, providing the image data for real-time monitoring or subsequent visualization.

BRIEF DESCRIPTION OF THE DRAWINGS

Various objects, features and advantages of the invention will be apparent from the following description of embodiments of the invention, as illustrated in the accompanying drawings.

DETAILED DESCRIPTION OF THE INVENTION

With reference to the figures, systems, devices and methods are disclosed for capturing, storing and processing acoustic reflections from tubulars of a well or pipe by an acoustic transducer array. The device typically also has an elongate cylindrical form factor and is sized to be deployable within the tubular, which is also elongate. Wells include cased and uncased wells, at any stage from during drilling to completion to production to abandonment.

Figure 2:
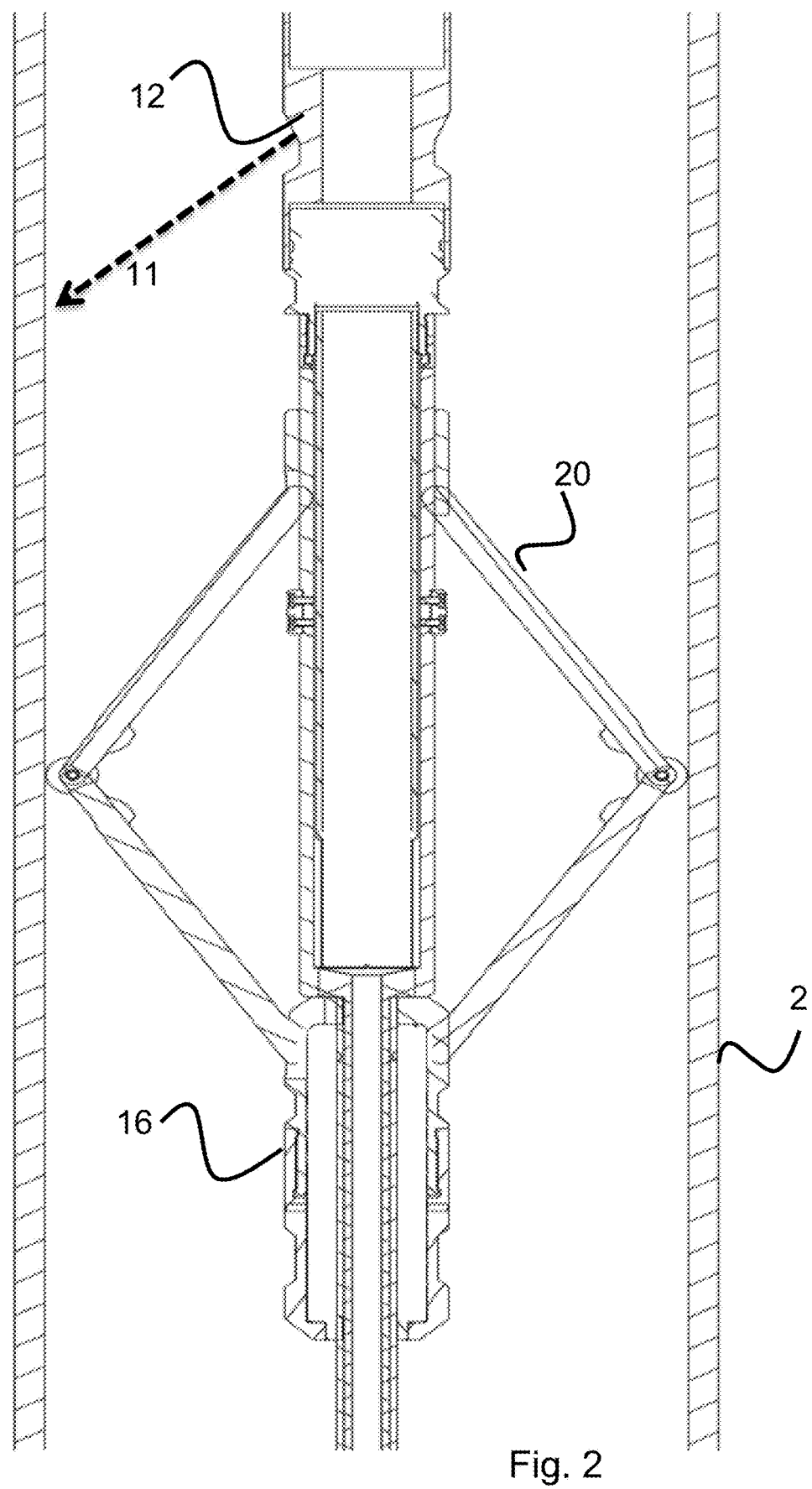
FIG. 2 is a cross-sectional view of an imaging device in a well.

The imaging device comprises a transducer array 12, preferably formed as a radial or frustoconical arrangement facing outwards to insonify a cross section of the tubular with scan lines 11, from the inner circumference outwards, as shown in FIG. 2. The device may be part of a tool string or operated alone. As the imaging device moves longitudinally through the tubular, the array capture frames of these cross sections, preferably on the order of millimeters. The reflections of these acoustic waves from the tubular features are converted to digital signals, often called raw RF data. Thus, each frame is an image in coordinates of azimuth and Radius ($\Theta$/R), and stacking frames completes the 3D image by incrementing in the axial (Z) dimension.

The raw RF data may be stored in memory or deconvolved (e.g. using a Hilbert transform) to store intensity values in memory, using the native polar coordinate (Z, $\Theta$, R) of the radial array moving axially in the tubular. Further processing on this data is maintained in polar coordinates to preserve the data and avoid Cartesian approximations.

Figure 4:
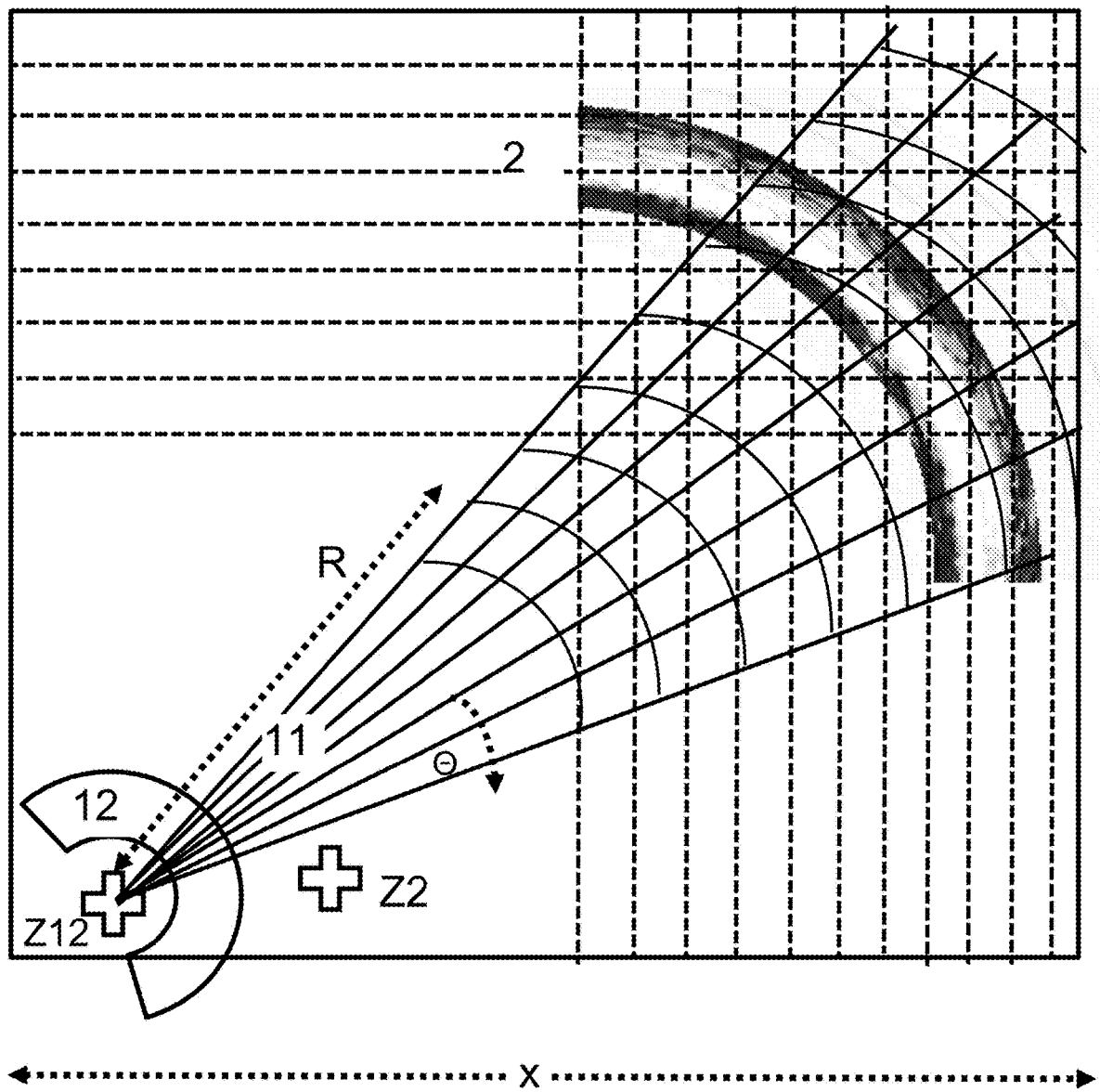
FIG. 4 is an illustration comparing polar and Cartesian pixels.

Thus, each voxel represents the 10-14-bit intensity value for each $\Theta$, R, Z location. As an example, a voxel may represent a physical wedge 1 mm long, of 1° arc, and 1 mm deep into the tubular. Each voxel may thus be created directly from the raw data of a scan line in its native dimensions. Conversely, a Cartesian voxel (X, Y, Z) of 1 mm×1 mm×1 mm would be an average of plural polar pixels nearest that Cartesian voxel. FIG. 4 illustrates a quarter ultrasound image of tubular 2 and the relevant, but exaggerated, voxels in polar and Cartesian coordinates. As shown, there is not a one to one relationship when scan converting between these coordinates. Here the imaging device is centered at axis Z12 emitting scan lines 11 but the tubular is centered on axis Z2.

In physical memory, a frame is stored "unwrapped." Thus, although a frame for a radial array stores scan lines in order from 0 to 360° in memory, the two ends are actually neighbours in the real-world tubular. Thus, algorithms that slide across multiple neighbouring scan lines should also wrap around the end scan lines in memory.

In these imaging tasks, particular significance is given to the tubular itself to identify features of the inner wall, outer wall or the integrity of the metal therebetween. A processor may operate on the stored data to remove reflections before or after the tubular, thus discarding data sampled from outside of some radial window. For example, while the raw data may be created from each of 256 scan lines, each sampled electronically by the ADC 1,024 times, the radial window filter may select only 100 samples from some radii R1 to R2 (see FIG. 5) to create a much smaller filtered data set in memory.

Figure 1:
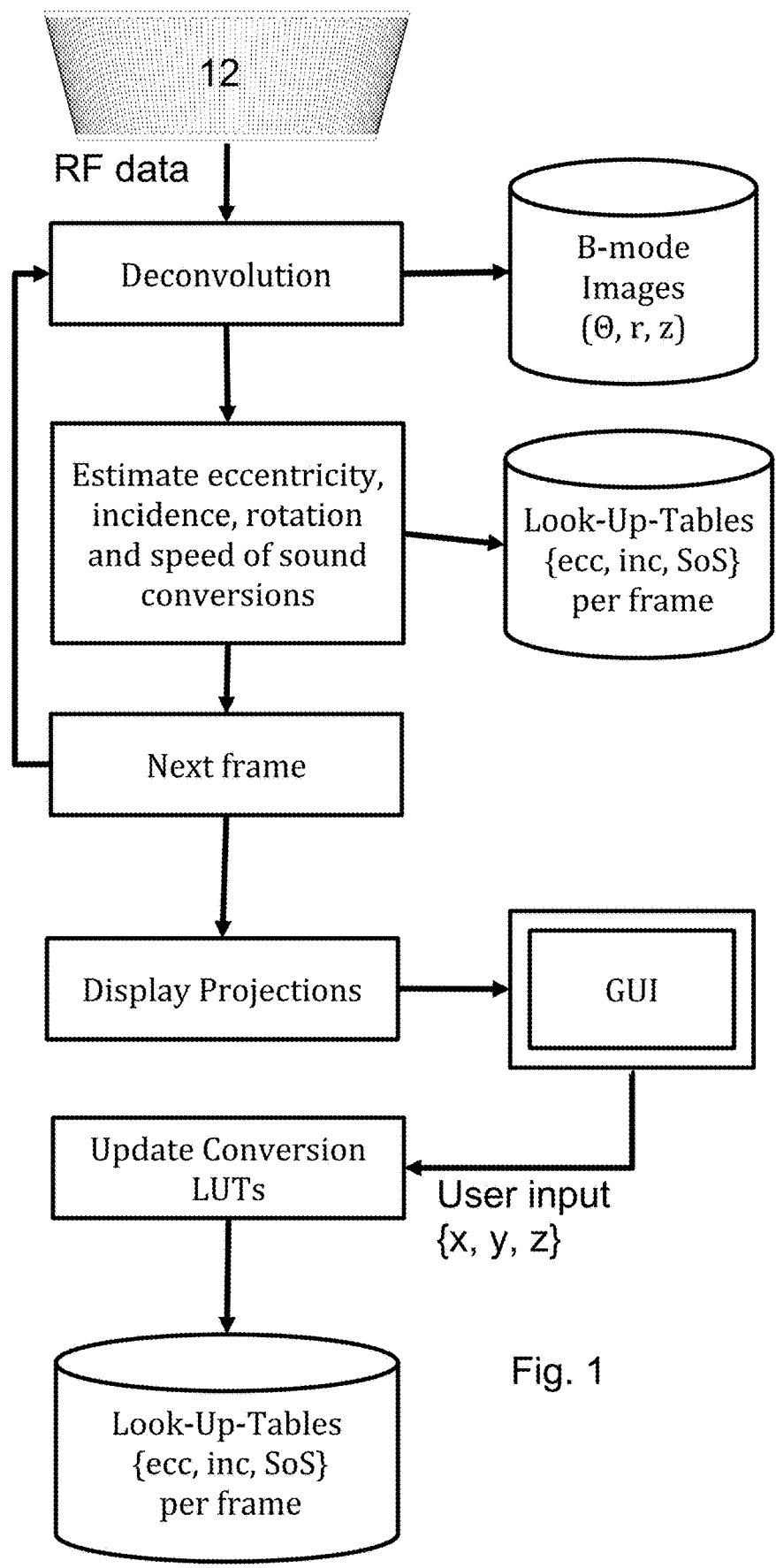
FIG. 1 is a flow diagram for storing and correcting ultrasound data.

FIG. 1 provides a data flow from raw data to rendering for display. A number of example algorithms for processing on the images are shown but other algorithms are envisaged. As shown, most of the algorithms operate on data in polar coordinates, and only the final rendering steps take place in another space (i.e. display space), appropriate for display to a user.

Corrections

The imaging device, tool and string are subject to variation in kinematics, geometry, and fluid as the tubular is logged. These variations are not typically experienced in medical or laboratory testing and thus the present system calculates and stores logging correction values. The values may be stored for plural locations along the tubular, potentially on a frame by frame basis or they may be interpolated between key frames. These correction values may be stored as Look-up-Tables (LUT) in a memory unit, referenced by a given frame or axial depth of the tubular. The values may be implemented as a combination of the corrections in one LUT, or preferably as plural LUTs, one for each correction mechanism. The latter schema allows the system to update or ignore a particular correction LUT, at the cost of increased real-time visualization processing.

The system may include corrections for one or more of: eccentricity, speed of sound (SoS), rotation, and incidence angle. These corrections may be stored in display coordinates or as scalars. When rendering for display, a requested pixel is translated radially and rotated in azimuth to find the corresponding corrected pixel in the ultrasound image. Similarly, the requested pixel may be corrected in Cartesian (x, y, z) offsets using the LUTs, which corrected pixels are fetched from the image data.

Eccentricity

Figure 3:
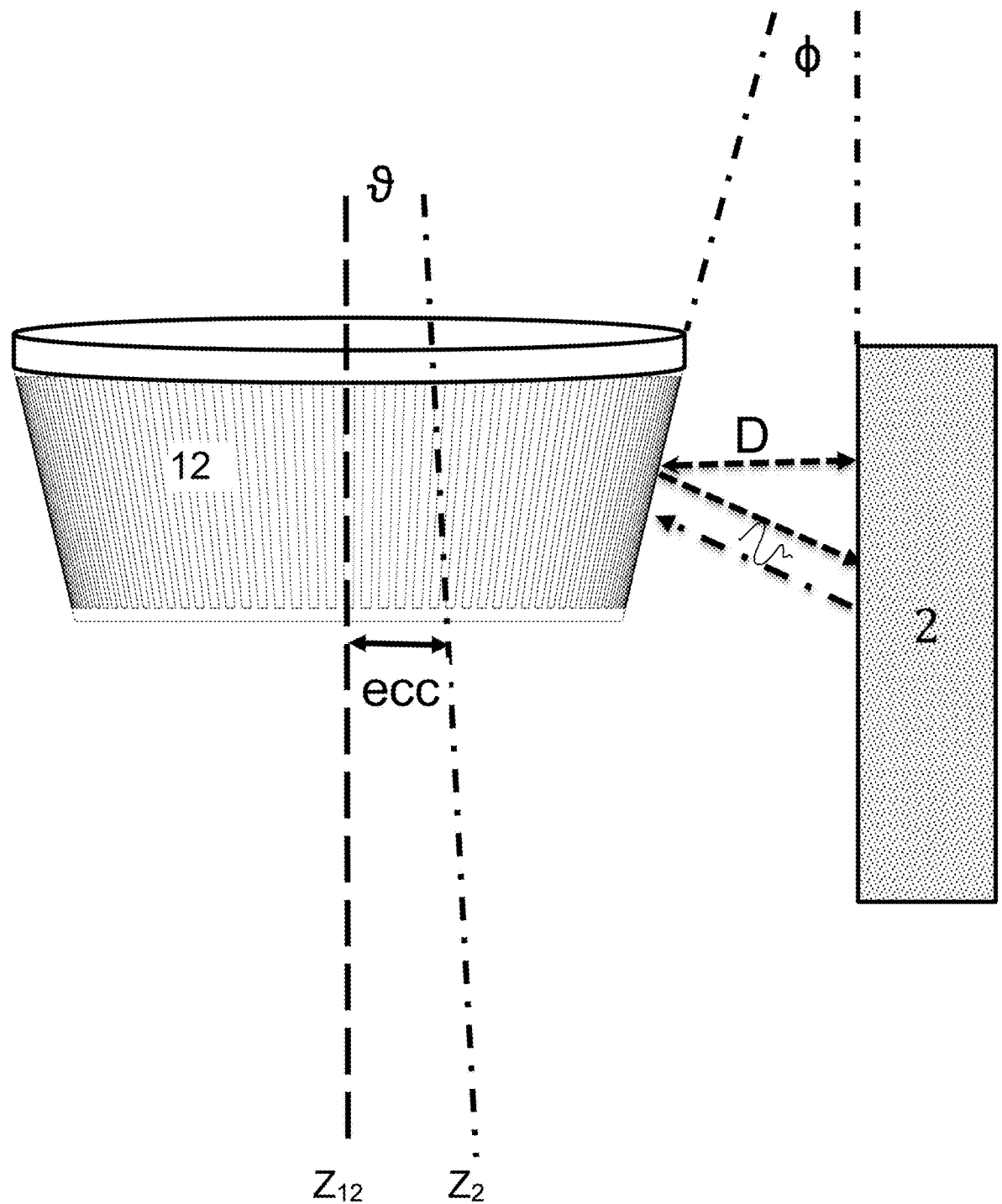
FIG. 3 is a side view of a radial acoustic array in a conical arrangement.

Ideally the imaging device and tubular are co-axial such that all reflection times from the circular tubular to the circular sensor array are equal. In reality, the weight and movement of the device causes the device to be off-center, especially in horizontal tubulars. FIG. 3 illustrates the offset ECC between the axis $Z_{12}$ of the array 12 and axis $Z_2$ of the tubular 2. Thus, an Eccentricity Correction Algorithm is used to determine the amount of correction needed to offset the eccentricity and thus identify the correct image pixels. Such an algorithm may identify the brightest reflections from the inner surface and fit this to a model, such as a sinusoid, Circle Fit or Ransac function. The fitted model is used to move the imaged pixels to where they would be for a centered device to create the output data.

The eccentricity LUT may store the transverse offset as a vector X, Y in micrometers. This correction may be different at other location along the tubular, e.g. at a different image frame.

Depth

The tubulars used in most of the applications concerned herein are very long (i.e. more than 1 km) and the imaging device cannot easily be predictably deployed to a known depth. Thus the system creates and uses a Depth LUT to determine the depth (i.e. axial location) of the transducer array along the tubular. Depth for each frame may be a priori estimated based on the deployment device's depth meter, such as a wireline truck's measure of line played out. However, due to stiction of the imaging device on the wall, stretch in the wireline, and changes to scan rate, the actual depth value of a given frame should be corrected.

Thus, the Depth LUT comprises a depth value for a given frame number. The depth value may represent the absolute depth from the top of the wellbore or entry port into a pipeline.

The Depth LUT may be determined by processing the log of the tubular to identify features of known depth such as collars, valves, or perforations and then extrapolating therefrom. Processing of the acoustic images may also be used to identify and correct regions of stiction (i.e. no frame movement followed by rapid frame movement). The LUTs may also be manually corrected by a user interacting with the User Interface. Here the expert user will be able to identify the depth of frames that are displayed.

Incidence Angle

A radial array 12 emits a radially-outward wave that may insonify the tubular 2 at a non-normal angle of incidence $\phi$, as illustrated in FIG. 3. In such cases, the path travelled and thus time-of-flight (T) for the wave is longer than for the normal incidence case. The reflected wave is sampled in time, which is then converted to the normal distance (D) from the transducer surface by the speed of sound (SoS) by calculating an incidence correction factor. Similarly, the reflections are returned from tubular features that are longitudinally offset from (i.e. further downhole or uphole than) the transducer. One effect of this incidence angle, if not corrected, is that sudden changes in radius will appear as tapered changes on the display.

If the tool string contains multiple transducers, each of different angle (I) or of variable angles, the processor will compute an appropriate value for each incidence correction.

The radial distance of a reflection is determined using the speed of sound through the medium. This speed may be assumed based on the expected fluid in the tubular or material of the tubular or formation. The imaging device may also comprise a speed of sound calibration sensor that samples the fluid to adjust those assumptions. The actual speed may also be corrected by determining a factor between the measured distance and known geometry of the wellbore or tubular. This Speed of Sound or the factor may be stored in a LUT as a floating point to adjust the radial location of pixels inwards and outwards.

Rotation

As the imaging device and tubular are only connected at points by centralizers, the device is free to rotate with respect to the wellbore or tubular. Per FIG. 3, axis $Z_{12}$ may rotate with respect to $Z_2$. In the displayed projections, it is desirable to maintain some fixed coordinate system for the user, such as some notion of high-side and low-side of the tubular. Thus, images captured of the tubular will need to be rotated to be displayed in some fixed display space. These rotation correction values may be calculated in radians (or degrees) to rotate and then stored in its LUT.

The rotation correction may be determined using sensors on the imaging device, such as multi-axis accelerometers, gyro meters, and magnetometers. Alternatively, the system may use image processing to identify a frame's rotation from misalignment of features of the tubular between frames.

Axes Misalignment

Ideally the elongate imaging device and elongate tubular have their longitudinal axes aligned, i.e. the axes are parallel. However, due to curves in the tubular, irregularity of the tubular radius, and build up of sand in the tubular, the centralizers of the tool string may tilt the imaging device with respect to the tubular wall. This tilt may be detected by sensors (e.g. accelerators or gyrometers) of the tool or determined by post-processing of the ultrasound image.

This logging factor is somewhat orthogonal to eccentricity, whereby the axes are offset but aligned, rather than misaligned but coincident. For misalignment, the effect is that a given frame captures parts of the tubular more uphole or downhole than other parts, i.e. the pixels need to be corrected in ±Z by an amount that varies for the pixel's circumferential locations.

The calculated misalignment for a frame is defined by a 2D vector ($\vartheta$, N): the angle misalignment ($\vartheta$); centered on scanline N. See FIG. 3. The correction vector may be stored for each frame or, to speed rendering in real-time, may be stored as a set of ±Z offsets for each scanline in the frame.

Rendering

After the image data has been filtered and corrected, it may be rendered for display. A rendering engine may reside in software or on a GPU and has numerous standard rendering algorithms to output a visually pleasing 2D image. Known rendering engines normally operates on pixels provided in Cartesian space, so a Cartesian voxel to display will be fetched from several polar coordinate voxels, LUT corrected, combined and then scan converted to Cartesian.

In addition to standard rendering options such as ray marching, texturing, and lighting, application-specific rendering may be applied to convey surface roughness, material reflectivity, attenuation, impedance and tubular defects. While some of these effects have no analogue in camera imaging, they highlight features detectable by ultrasound waves, especially those relevant to tubular structural integrity. For example, a small crack that is invisible to cameras may create a ringing ultrasound wave that can be displayed in a differentiating way on the monitor.

Projections

The Graphic User Interface (GUI) may comprise several panels, each displaying a projection of the tubular imaged. These may be orthogonal to each other and may be 2D or 3D views. While the images are 3D, most displays themselves are 2D, and so the rendering engine determines what pixels would be visible from a selected perspective of the user for a given real-world location. The rendering engine also determines lighting effects and applies textures, as known in the art.

Interactive elements of the UI allow the user to select an axial position (Z) along the tubular, a relative viewing position, and the type(s) of projections desired. The system converts between real-world locations of the imaged tubular (i.e. acoustic image space) and display space of the UI.

At some initial display time, the UI displays unfiltered data, being data that has not had one or more of the available filters applied.

Unlike curvilinear medical probes, the present radial array generates images that should be wrapped at the ends for rendering. Thus, the polar pixels corresponding to Cartesian pixels for rendering operations may include polar pixels from the other end of the unwrapped image.

Figure 5:
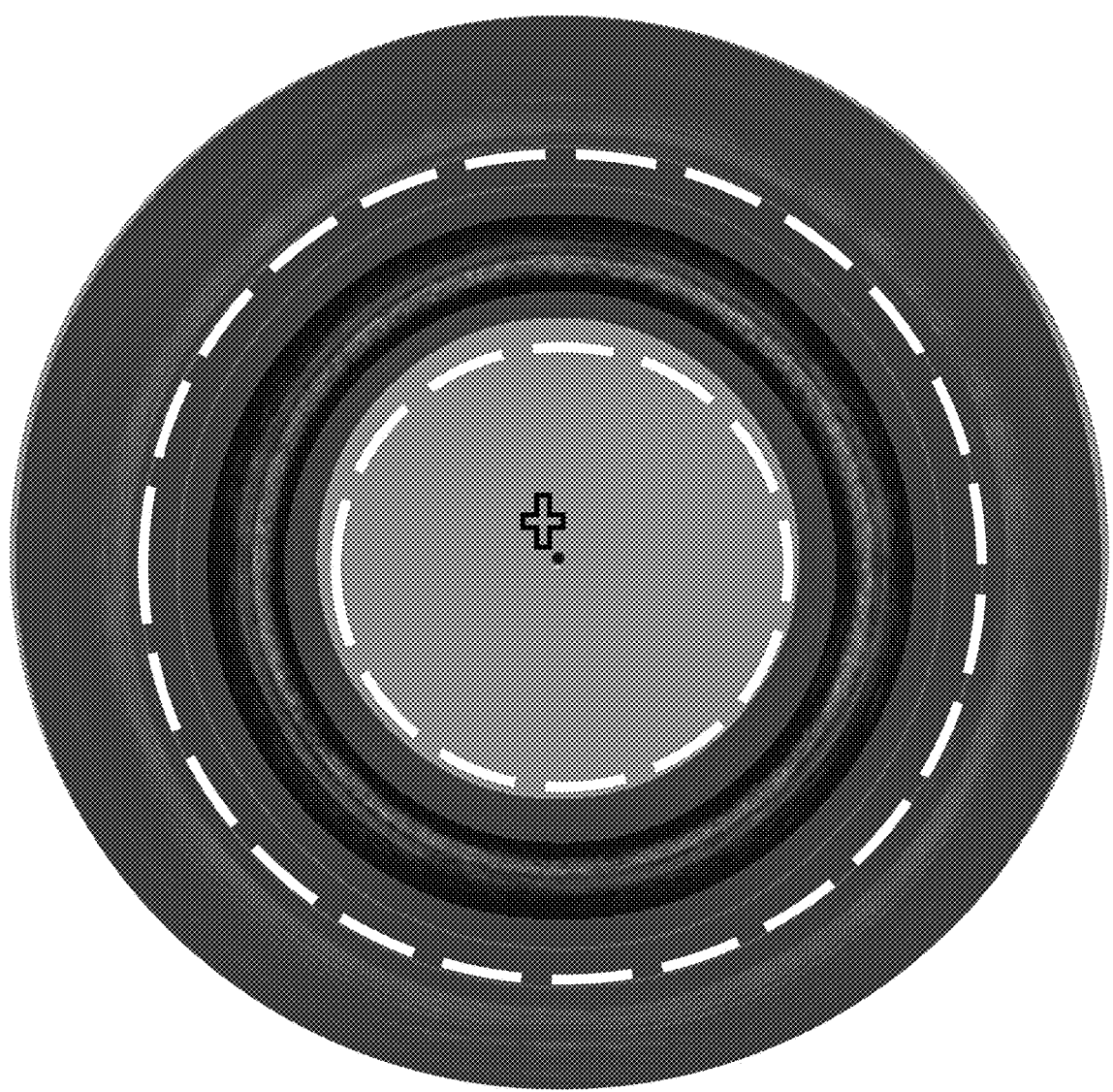
FIG. 5 is a cross-section projection of a tubular and eccentricity correction input.

FIG. 5 is a cross-sectional ultrasound image for a tubular. This image may be one of several projections shown on a display of a user interface. The user interface provides means to provide inputs to adjust the display of the projection and update the correction LUTs. As shown in dashed lines, a user has selected inner and outer radii for further analysis. The user has also input the centre of the tubular, distinct from the tool centre.

Image Processing

It is useful to determine the inner or outer surface of the tubular. These may be assumed to be continuous and circular for such a structure, despite the noise and loss of signals across the array. An Edge Detection algorithm may be used to determine an edge through neighbouring, bright pixels. In polar coordinates the algorithm may look for one pixel per scan line that share a similar radius across the edge. That is, the surface will not be a line along a scan line or change radius beyond a threshold rate, As discussed above, the algorithm should wrap the ends of the pixels in memory to find the surface that connects smoothly through those ends.

Advantageously, in polar coordinates, determining the correction may be performed by finding the first intense pixel for each scan line, and applying the correction may be performed by sliding each scan line in or out radially for each pixel to store the new radius in memory.

Once the user-selected ultrasound coordinate corrections have been applied to the ultrasound images, the processor may create geometric models of the tubular. Using edge detection and surface finding techniques, the processor can create a mesh of the tubular for analysis. Such analysis may include measuring diameter, lengths, connections or identifying damage and perforations.

Transducers

The array comprises a plurality of acoustic transducer elements 13, preferably operating in the ultrasound band, preferably arranged as an evenly spaced one-dimensional radial array (see FIG. 3). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features.

The number of individual elements in the transducer array affects the azimuthal resolution of the generated images. Typically, each transducer array is made up of 32 to 2,048 elements and preferably 128 to 1,024 elements. The logging speed and frame rate determines the axial resolution. Multiple transducer elements, per aperture, operate in a phase delayed mode to generate a scan line. There may be as many scan lines as elements by changing the aperture by a single element for each scan line.

The transducer elements may be distributed radially, equidistant around the body of the device. As seen in FIG. 3, the transducer elements 13 may be substantially radially-outward facing. A first reflection is received from the inner wall and then a second reflection is received from the outer wall. However, there may be multiple reflections as the wave bounces between walls.

The invention claimed is:

1. A method of processing acoustic images from an acoustic imaging device comprising:
receiving the acoustic images of tubulars,
determining plural logging correction values for plural locations of the tubulars;
rendering one or more projections of the tubulars for a user display by:
identifying display pixels required in display space;
identifying image pixels in the acoustic images corresponding to each display pixel using a) a coordinate transformation from acoustic image space to display space and b) the plural logging correction values; then
blending the identified image pixels to create the display pixels; and
displaying the one or more projections on the user display.

2. The method of claim 1, further comprising receiving a user input regarding a spatial offset, updating the logging correction values based on the spatial offset, and redisplaying the projection(s) using the updated logging correction values.

3. The method of claim 1, wherein determining the logging correction values is performed in response to receiving a user input defining the logging corrections values as spatial offsets in one of the displayed projections.

4. The method of claim 1, wherein the logging correction values are initially determined at least partly from sensors of the imaging device.

5. The method of claim 1, wherein the logging correction values relate to at least one of: eccentricity of the imaging device with respect to the tubulars; rotation of the imaging device with respect to the tubulars; misalignment of longitudinal axes of the imaging device and tubulars, and incidence angle of acoustic transducers of the imaging device with respect to a wall of the tubular; and speed of sound of fluid in the tubulars.

6. The method of claim 1, wherein said acoustic images have image pixels arranged in a first dimension representing scan lines in azimuth of an imaging device and in a second dimension representing radial distance outward from said imaging device.

7. The method of claim 1, wherein rendering comprises one or more of: shading, texturing, lighting, and ray tracing.

8. The method of claim 1, further comprising acquiring the acoustic images by logging an imaging device having a radial array of acoustic transducers through the tubular longitudinally.

9. The method of claim 1, wherein the projections include tube view and cross-section view of the tubular.

10. The method of claim 1, wherein the coordinate transformation converts from polar coordinates of the image space to cartesian coordinates in display space.

11. The method of claim 1, wherein the projections comprise at least one projection that is orthogonal to another of the projections.

12. A system for processing acoustic images of a tubular, the system comprising a user interface, and one or more computing devices configured to:
receive acoustic images of tubulars;
determine plural logging correction values for plural locations of the tubular;
render one or more projections of the tubular for a user interface by:
i. identifying display pixels required in display space;
ii. identifying image pixels in the acoustic images corresponding to each display pixel using a) a coordinate transformation from acoustic image space to display space and b) the plural logging correction values;
iii. blending the identified image pixels to create the display pixels; then display the one or more projections on the user interface.

13. The system of claim 12, further comprising an imaging device having a radial array of acoustic transducers.

14. The system of claim 13, wherein said acoustic images have image pixels arranged in a first dimension representing scan lines in azimuth of the imaging device and in a second dimension representing radial distance outward from the imaging device.

15. The system of claim 13, wherein the imaging device comprises sensors and wherein the logging correction values are initially determined at least partly from the sensors, preferably wherein the sensors are one or more of: accelerometers, gyro meters, speed of sound sensors and magnetometers.

16. The system of claim 12, wherein the computing devices are further configured to receive a user input regarding a spatial offset, update the logging correction values based on the spatial offset, and redisplay the projection(s) using the updated logging correction values.

17. The system of claim 12, wherein determining the logging correction values is performed in response to receiving a user input defining the logging corrections values as spatial offsets in one of the displayed projections.

18. The system of claim 12, wherein the logging correction values relate to at least one of: eccentricity of an imaging device with respect to the tubular; rotation of the imaging device with respect to the tubular; misalignment of longitudinal axes of the imaging device and tubular, and incidence angle of acoustic transducers of the imaging device with respect to a wall of the tubular; and speed of sound of fluid in the tubular.

19. The system of claim 12, wherein the projections include tube view and cross-section view of the tubular.

20. The system of claim 12, wherein the computing devices comprise memory for storing the logging correction values in a Look Up Table (LUT).

\* \* \* \* \*